United States Patent [19]

Asano

[11] Patent Number: 4,921,061
[45] Date of Patent: May 1, 1990

[54] ELECTRIC POWER STEERING APPARATUS

[75] Inventor: Hiroaki Asano, Okazaki, Japan

[73] Assignee: Toyoda Koki Kabushiki Kaisha, Kariya, Japan

[21] Appl. No.: 223,342

[22] Filed: Jul. 25, 1988

[30] Foreign Application Priority Data

Jul. 25, 1987 [JP] Japan ................... 62-185834

[51] Int. Cl.$^5$ .............................................. B62D 5/04
[52] U.S. Cl. ................... 180/79.1; 180/132; 180/142; 192/57; 192/85 AA; 192/103 F
[58] Field of Search ............ 180/79.1, 142, 132, 180/252, 57; 192/103 F, 35, 85 AA, 85 CA

[56] References Cited

U.S. PATENT DOCUMENTS

| 4,753,308 | 6/1988 | Noto et al. | 180/79.1 |
| 4,762,194 | 8/1988 | Morishita et al. | 180/42 |
| 4,765,425 | 8/1988 | Saito et al. | 180/79.1 |

FOREIGN PATENT DOCUMENTS 2492558 4/1982 France .......................... 180/79.1

772682 4/1957 United Kingdom .......... 180/79.1

Primary Examiner—Charles A. Marmor
Assistant Examiner—Anne Marie Boehler
Attorney, Agent, or Firm—Oblon, Spivak, McClelland, Maier & Neustadt

[57] ABSTRACT

An electric power steering apparatus is provided with a torque sensor for detecting manual torque input to a steering shaft of an automobile and an electric motor for generating auxiliary steering power so that a load current is applied to the electric motor in accordance with the level of manual torque detected by the torque sensor. The electric motor and a steering system are coupled together through a speed reducing mechanism for reducing the speed of rotation of the electric motor and also through a clutch mechanism. The electric power steering system is further provided with an actuating mechanism for controlling the clutch mechanism such that it is engaged only when the electric motor is rotating. Therefore, the speed reducing mechanism and the electric motor have no adverse effects on the return of the steering wheel.

3 Claims, 2 Drawing Sheets

ELECTRIC POWER STEERING APPARATUS

BACKGROUND OF THE INVENTION

1. Field of the Invention

The present invention relates to an electric power steering apparatus wherein auxiliary steering power is derived from an electric motor.

2. Discussion of the Prior Art

A typical conventional electric power steering apparatus has a torque sensor for detecting manual torque input to a steering shaft and an electric motor for generating auxiliary steering power so that a load current is supplied to the electric motor in accordance with the level of manual torque detected by means of the torque sensor, thereby assisting the driver with steering force.

The electric power steering apparatus of the type described above is generally arranged to assist the driver with steering force by transmitting the rotation of the electric motor after the speed of the rotation has been reduced through a speed reducing mechanism. The reduction ratio of the speed reducing mechanism cannot be increased unrestrictedly because smooth return of the steering wheel must be ensured. For this reason, the prior art needs a large-sized motor and therefore suffers from the problems of a high rate of consumption of electric current and a need for large torque in a low-speed region where the motor efficiency is low.

SUMMARY OF THE INVENTION

Accordingly, it is an object of the present invention to provide an electric power steering apparatus which is designed so that it is possible to use a speed reducing mechanism having a large reduction ratio and hence unnecessary to employ a large-sized motor and yet it is possible to ensure smooth return of the steering wheel.

It is another object of the present invention to provide an electric power steering apparatus having the merit, in addition to the above-described features and advantages, that it is possible to ensure smooth return of the steering wheel irrespective of the characteristics of the motor and speed reducing mechanism.

In brief, the electric power steering apparatus according to the present invention is provided with a torque sensor for detecting manual torque input to a steering shaft of an automobile and an electric motor for generating auxiliary steering power so that a load current is applied to the electric motor in accordance with the level of manual torque detected by the torque sensor. The electric motor and a steering system are connected together through a speed reducing mechanism for reducing the speed of rotation of the electric motor and also through a clutch mechanism. The electric power steering system is further provided with actuating means for controlling the clutch mechanism such that it is engaged only when the electric motor is rotating.

By virtue of the above-described arrangement electric motor for generating auxiliary steering power and the steering system are connected together through the speed reducing mechanism for reducing the speed of rotation of the electric motor and also through the clutch mechanism which is engaged only when the electric motor is rotating. Therefore, the speed reducing mechanism and the electric motor have no adverse effects on the return of the steering wheel. Accordingly, it is possible to increase the degree of freedom with which the speed reducing mechanism and the motor are designed and thus obtain an electric power steering apparatus which has a reduced size and yet operates efficiently.

BRIEF DESCRIPTION OF THE ACCOMPANYING DRAWINGS

The above and other objects, features and advantages of the present invention will become more apparent from the following description of the preferred embodiment thereof, taken in conjunction with the accompanying drawings, in which like reference numerals denote like elements and, in which:

FIG. 1 is a sectional view of the electric power steering apparatus according to the present invention; and FIG. 2 is an enlarged sectional view taken along the line II—II of FIG. 1.

DETAILED DESCRIPTION OF THE PREFERRED EMBODIMENT

Figure 1:
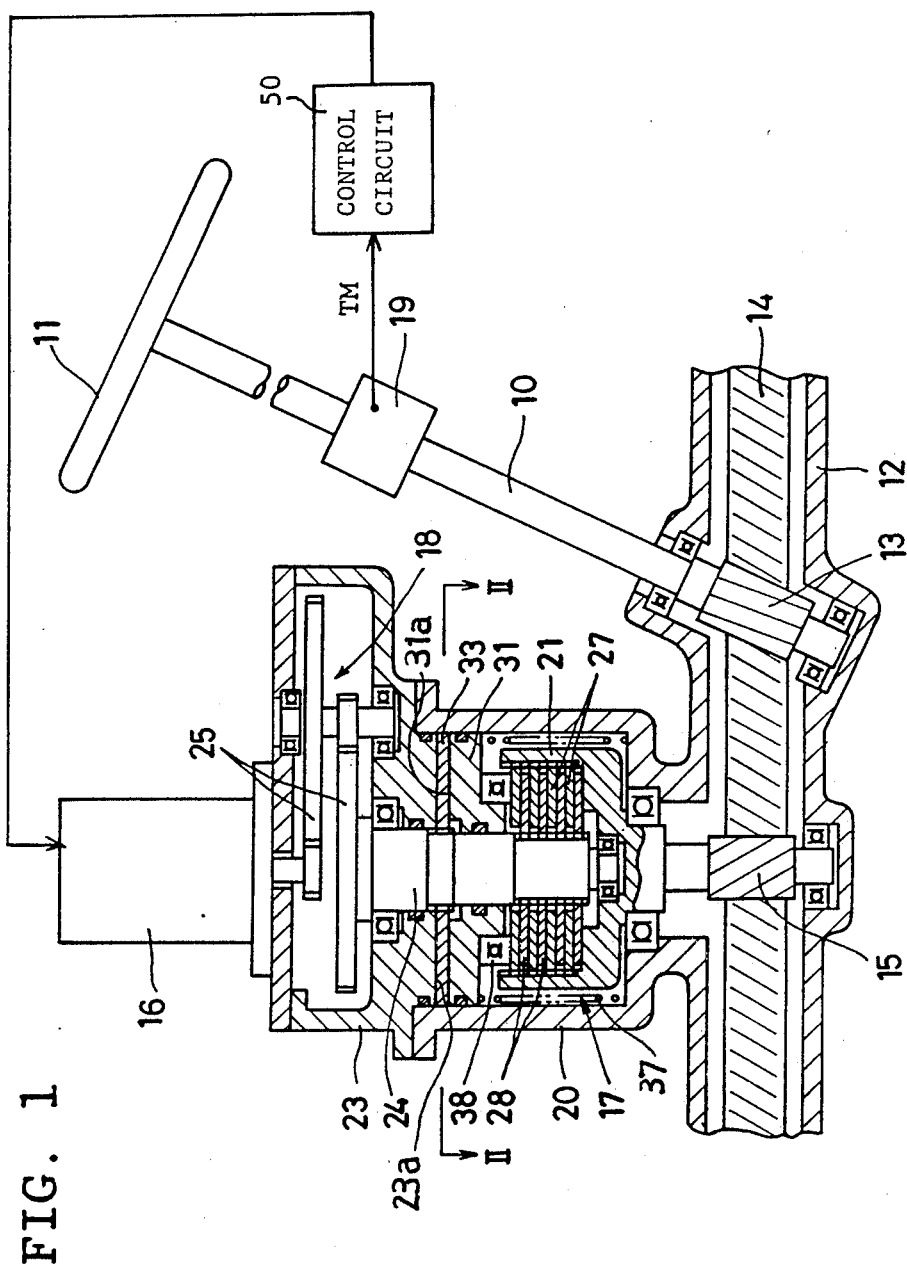

Referring to FIG. 1, the reference numeral 10 denotes a steering shaft. A steering wheel 11 is secured to one end of the steering shaft 10, and a pinion shaft 13 which is rotatably supported in a gear box 12 is connected to the other end of the steering shaft 10. The pinion 13 is meshed with a rack 14 which is slidably fitted in the gear box 12. Both ends of the rack 14 are connected to steered wheels through steering link mechanisms (not shown), respectively. The rack 14 is also meshed with a second pinion 15. An electric motor 16 which outputs auxiliary steering power $T_A$ for assisting the driver with steering force is connected to the second pinion shaft 15 through a clutch mechanism 17 and a speed reducing mechanism 18, which will be described hereinafter. Further, a torque sensor 19 for detecting manual torque $T_M$ applied to the steering wheel 11 is provided on the steering shaft 10.

One example of the combination of the clutch and speed reducing mechanisms 17 and 18 will next be explained.

The reference numeral 20 denotes a clutch casing which is provided integral with the gear box 12. The second pinion shaft 15 is rotatably supported in the clutch casing 20. A cup-shaped housing 21 is formed integral with one end of the pinion shaft 15. A gear casing 23 is secured to one end of the clutch casing 20. A driving shaft 24 is rotatably supported by a gear casing 23 in concentrical relation to the housing 21. The driving shaft 24 is rotatively coupled to the output shaft of the electric motor 16 installed on the gear casing 23 through a speed reducing mechanism 18 comprising a plurality of speed reducing gears 25.

A plurality of outer clutch plates 27 are spline-engaged with the inner periphery of the housing 21, while a plurality of inner clutch plates 28 are spline-engaged with the outer periphery of the driving shaft 24. The clutch plates 27 and 28 are alternately disposed to form a multiple disc clutch mechanism 17.

Figure 2:
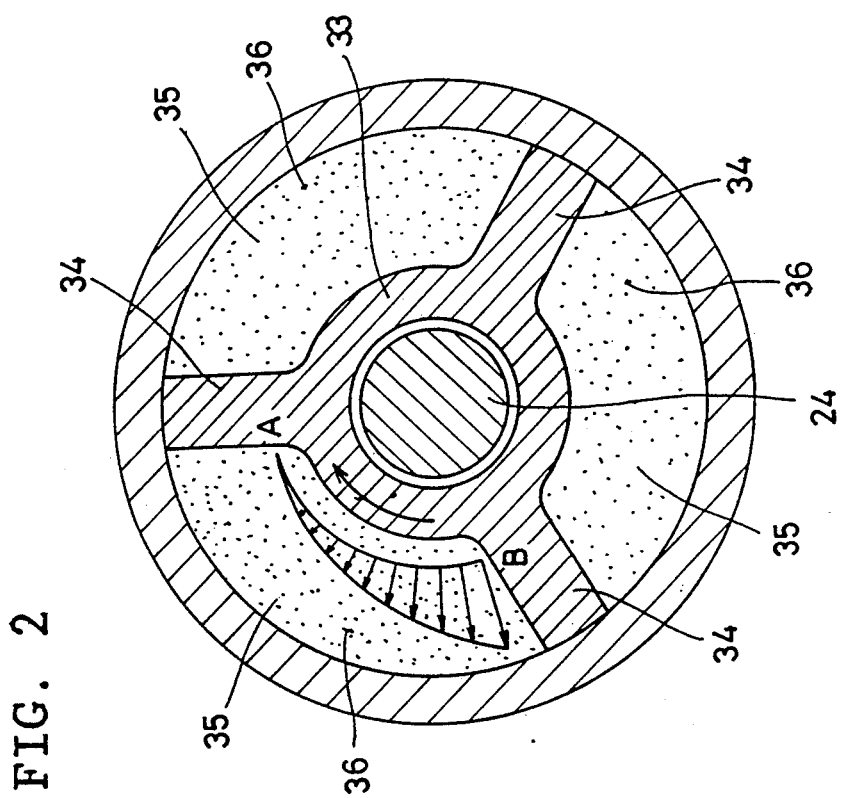

A pressure piston 31 is fitted in the clutch casing 20 between the clutch mechanism 17 and the gear casing 23 in such a manner that the piston 31 is capable of only sliding (i.e., it is prevented from rotating). A rotor 33 having a relatively small axial wall thickness is accommodated in the area between one end (the upper end as viewed in the figure) of the pressure piston 31 and the lower end wall of the gear casing 23 in such a manner that the rotor 33 is capable of sliding contact with the piston 31 in the direction of rotation of the rotor 33. The rotor 33 is, as shown in FIG. 2, spline-engaged at its central portion with the outer periphery of the driving shaft 24 and has a plurality of circumferentially spaced blades 34 which extend radially. The rotor 33 is fitted in the clutch casing 20 in such a manner that the outer ends of the blades 34 are capable of sliding contact with the inner periphery of the clutch casing 20, thereby defining sealing portions. Thus, a plurality of circumferentially partitioned space portions 35 are defined by the plurality of blades 34 between the pressure piston 31 and the gear casing 23. The space portions 35 are filled with a high-viscosity oil 36, for example, silicone oil or the like. It should be noted that a spring 37 is interposed between the pressure piston 31 and the clutch casing 20 to press the pressure piston 31 in the direction in which it clamps the rotor 33 between the same and the gear casing 23.

With the above-described arrangement, as the driving shaft 24 is rotated by the operation of the electric motor 16 and the rotor 33 is thereby rotated within the clutch casing 20, the high-viscosity oil 36 sealed in the space portions 35 is forced to move in the area between the limited two faces by the pressing action of each blade 34 at a flow velocity corresponding to the speed of rotation of the rotor 33. At this time, an internal pressure corresponding to the speed of rotation of the rotor 33 is generated in each space portion 35 by viscous friction occurring between the oil 36 and the opposing end faces of the gear casing 23 and the pressure piston 31. Namely, although the high-viscosity oil 36 is forced to move when the blades 34 are rotated, the high-viscosity oil 36 tends to remain as it was, because the high-viscosity oil 36 is adhering to the end face 23a of the gear casing 23 and the end face 31a of the pressure piston 31. This adhesion of the oil 36 produces viscous friction between the oil 36 and the opposing end faces 23a, 31a. Since the direction of the pushing forces by the blades 34 and the direction of obstruction force by the viscous friction between the oil 36 and the opposing end faces 23a, 31a are opposite each other, the pressure is generated in the oil 36 in proportion to the pushing forces by the blades 34. Moreover, since the pushing forces by the blades 34 become large as the rotational speed of the rotor 33 increases, the pressure generated in the space 35 increases in accordance with the rotational speed. More specifically, in the case where the rotor 33 rotates clockwise (in the direction of the arrow) as viewed in FIG. 2, if the inner end of the preceding blade 34 which defines one space portion 35 is represented by A, and the inner end of the following blade 34 by B, the internal pressure in the space portion 35 shows such a pressure distribution that the pressure is the highest at the point B and the lowest at the point A. Thus, a pressure which is proportional to the speed of rotation of the rotor 33, that is, the rotational speed of the electric motor 16, is generated in the space portion 35. Accordingly, the pressure thus generated acts on the pressure piston 31, so that the plurality of clutch plates 27 and 28 are pressed through a thrust bearing 38 and thereby brought into frictional engagement with each other. Thus, torque (auxiliary steering power $T_A$) derived from the electric motor 16 is transmitted to the rack 14 through the clutch mechanism 17.

When the rotor 33 is at rest, however, the pressure acting on the piston 31 is low, so that the clutch plates 27 and 28 constituting the clutch mechanism 17 are kept disengaged from each other by means of the spring 37 which acts on the pressure piston 31, thereby enabling the second pinion shaft 15 and the driving shaft 24 to rotate relative to each other.

Thus, the pressure piston 31, the rotor 33 and the high-viscosity oil 36 sealed in the space portions 35 constitute in combination an actuating means 40 for controlling the clutch mechanism 17 such that it is engaged only when the electric motor 16 is rotating.

The following is a description of the operation of the above-described arrangement.

When the steering wheel 11 is turned, a positive or negative output corresponding to the manual torque $T_M$ applied to the steering shaft 10 is generated from the torque sensor 19 and applied to a control circuit 50. The control circuit 50 is arranged such as to determine the direction of rotation of the electric motor 16 on the basis of the output from the torque sensor 19, control the output current which is to be applied to the motor 16, and start the motor 16 at a rotational speed corresponding to the manual torque $T_M$. As the electric motor 16 is started at a predetermined rotational speed, the driving shaft 24 is rotated through the speed reducing mechanism 18, and the rotor 33 is rotated together with the driving shaft 24 in one unit. The rotation of the rotor 33 causes the blades 34 to force the high-viscosity oil 36 sealed in the space portions 35 to move in the area defined between each pair of adjacent surfaces, thus generating in each space portion 35 an internal pressure proportional to the speed of rotation of the rotor 33, that is, the rotational speed of the electric motor 16. The resulting internal pressure acts on the pressure piston 31, so that the clutch plates 27 and 28 constituting the clutch mechanism 17 are brought into frictional engagement with each other by means of engaging force corresponding to the internal pressure. Accordingly, the torque transmitted from the electric motor 16 to the driving shaft 24 through the speed reducing mechanism 18 is further transmitted to the second pinion shaft 15 at a level which corresponds to the speed of rotation of the motor 16 through the clutch mechanism 17 to move the rack 14 axially so as to assist the driver with steering force required to direct the steered wheels. Accordingly, when the manual torque $T_M$ is large, correspondingly large assist power is provided to direct the steered wheels, whereas, when the manual torque $T_M$ is small, correspondingly small assist power is provided to direct the steered wheels.

When the electric motor 16 is in an inoperative state, the internal pressure acting on the pressure piston 31 is low, so that the clutch plates 27 and 28 constituting the clutch mechanism 17 are disengaged from each other. Therefore, when the steering wheel 11 is returned, the movement of the rack 14 allows only the second pinion 15 and that part of the clutch mechanism 17 which is provided on the housing 21 to rotate freely, and the speed reducing mechanism 18 and the electric motor 16 have no effect on the return of the steering wheel 11.

Thus, since the speed reducing mechanism 18 has no effect on the return of the steering wheel 11, it is possible to maximize the reduction ratio of the speed reducing mechanism 18, which means that it is possible to use a smaller-sized motor to obtain the same level of assist power and it is also possible to use the motor in a high-speed region where the motor efficiency is high.

Moreover, when a multiple disk clutch such as that shown in the foregoing embodiment is employed as the clutch mechanism 17, any unstable movement of the motor can be absorbed by the sliding contact between the clutch plates.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. An electric power steering apparatus comprising
a steering mechanism actuated by the rotation of a steering wheel to change the direction of a steered wheel;
an auxiliary driving shaft connected to said steering mechanism to provide assist power;
an electric motor for generating power to rotate said auxiliary driving shaft;
a speed reducing mechanism connected to said motor to reduce the speed of rotation of said motor;
a clutch mechanism provided between said speed reducing mechanism and said auxiliary driving shaft to selectively connect together a rotary output shaft of said speed reducing mechanism and said auxiliary driving shaft;
a casing in which said clutch mechanism is accommodated;
a piston disposed in said casing so as to be movable only in the axial direction so as to actuate said clutch mechanism, said casing and said piston defining therebetween a pressure generating chamber;
a rotor accommodated in said pressure generating chamber so as to be rotated by the rotary output shaft of said speed reducing mechanism, said rotor having a plurality of blade portions extending radially; and
a high-viscosity fluid sealed in said pressure generating chamber in order to generate a pressure by which said piston is moved axially when said rotor is rotated.

2. An electric power steering apparatus having a torque sensor for detecting manual torque input to a steering shaft of an automobile, an electric motor for generating auxiliary steering power, and a control circuit arranged to apply a load current to said motor in accordance with the level of manual torque detected by said torque sensor, wherein the improvement comprises a combination of a speed reducing mechanism for reducing the speed of rotation of said electric motor and a clutch mechanism through which said motor and a steering system are connected together, and actuating means having a casing, a piston provided in said casing for actuating said clutch mechanism by its axial movement and for defining a pressure generating chamber, a rotor having plural blade portions provided in said pressure generating chamber in order to be rotated by the output shaft of said speed reducing mechanism, and a high viscosity fluid sealed in said pressure generating chamber in order to generate a pressure by which said piston is moved axially when said rotor is rotated.

3. An electric power steering apparatus according to claim 2, wherein said clutch mechanism is defined by a multiple disc clutch.

* * * * *